(12) United States Patent
Wei et al.

(10) Patent No.: US 8,533,066 B2
(45) Date of Patent: Sep. 10, 2013

(54) METHOD AND APPARATUS FOR RECOMMENDING MEDIA PROGRAMS BASED ON CORRELATED USER FEEDBACK

(75) Inventors: Xuan Wei, Beijing (CN); Hang Li, Beijing (CN); Hua Zheng, Beijing (CN); Ting-hao Yang, Beijing (CN); Richard W. Tom, Los Angeles, CA (US)

(73) Assignee: Hulu, LLC, Santa Monica, CA (US)

( * ) Notice: Subject to any disclaimer, the term of this patent is extended or adjusted under 35 U.S.C. 154(b) by 371 days.

(21) Appl. No.: 12/975,182

(22) Filed: Dec. 21, 2010

(65) Prior Publication Data

US 2012/0096086 A1   Apr. 19, 2012

Related U.S. Application Data

(60) Provisional application No. 61/392,898, filed on Oct. 13, 2010.

(51) Int. Cl.
*G06Q 30/00* (2012.01)

(52) U.S. Cl.
USPC .................. 705/26.7; 705/26.1; 705/26.8

(58) Field of Classification Search
USPC ............................ 705/1.1, 26.1–27.2, 51–59
See application file for complete search history.

(56) References Cited

U.S. PATENT DOCUMENTS

| | | | |
|---|---|---|---|
| 5,798,785 A | 8/1998 | Hendricks et al. | |
| 6,438,579 B1 | 8/2002 | Hosken | |
| 6,725,275 B2 | 4/2004 | Eyal | |
| 2002/0019763 A1* | 2/2002 | Linden et al. | 705/10 |
| 2002/0116291 A1* | 8/2002 | Grasso et al. | 705/27 |
| 2002/0120564 A1* | 8/2002 | Strietzel | 705/40 |
| 2003/0028896 A1 | 2/2003 | Swart et al. | |
| 2003/0149975 A1 | 8/2003 | Eldering et al. | |
| 2004/0255330 A1 | 12/2004 | Logan | |
| 2004/0268386 A1 | 12/2004 | Logan et al. | |
| 2005/0022239 A1 | 1/2005 | Meuleman | |
| 2005/0198068 A1 | 9/2005 | Mukherjee et al. | |
| 2006/0288000 A1 | 12/2006 | Gupta | |
| 2007/0130585 A1 | 6/2007 | Perret et al. | |
| 2008/0127251 A1 | 5/2008 | Wachtfogel et al. | |
| 2009/0292700 A1 | 11/2009 | Castellani et al. | |
| 2010/0010877 A1 | 1/2010 | Hunt et al. | |
| 2010/0082604 A1 | 4/2010 | Gutt et al. | |
| 2010/0146559 A1* | 6/2010 | Lee et al. | 725/61 |

(Continued)

FOREIGN PATENT DOCUMENTS

GB    2443959    5/2008

OTHER PUBLICATIONS

Amazon Maps Path to Web Success for Other Retailers Technology of Site Leads to Spinoff Firm; [Broward Metro Edition] Helen Jung the Associated Press. South Florida Sun—Sentinel. Fort Lauderdale, Fla.: Jun. 29, 2003. p. 3.G.*

(Continued)

*Primary Examiner* — William Allen
(74) *Attorney, Agent, or Firm* — Fountainhead Law Group P.C.

(57) ABSTRACT

A method and apparatus for recommending a media program of a set of media programs to a user of a set of users is disclosed. The method and apparatus computes a measure $w_{ij}$ of the implied similarity of a first media program (i) and a second media program (j) that corrects for the popularity of the media programs, thus resulting in a more accurate indication of the relatedness of the media programs.

20 Claims, 6 Drawing Sheets

(56) References Cited

U.S. PATENT DOCUMENTS

2010/0235313 A1  9/2010  Rea et al.
2012/0054638 A1* 3/2012  Ingoldby et al. .............. 715/751
2012/0084226 A1* 4/2012  Murdock et al. .............. 705/347

OTHER PUBLICATIONS

International Search Report from PCT Application No. PCT/US20111056214, mailed Mar. 8, 2012.

* cited by examiner

METHOD AND APPARATUS FOR RECOMMENDING MEDIA PROGRAMS BASED ON CORRELATED USER FEEDBACK

CROSS REFERENCE TO RELATED APPLICATIONS

This application claims benefit of U.S. Provisional Patent Application No. 61/392,898, entitled "METHOD AND APPARATUS FOR RECOMMENDING MEDIA PROGRAMS BASED ON CORRELATED USER FEEDBACK," by Xuan Wei, Hang Li, Hua Zheng, Ting-hao Yang, and Richard W. Tom, filed Oct. 13, 2010, which application is hereby incorporated by reference herein.

BACKGROUND OF THE INVENTION

1. Field of the Invention

The present invention relates to systems and methods for providing information regarding media programs to users, and in particular to a system and method for recommending media programs to users based on correlated user feedback.

2. Description of the Related Art

The dissemination and playback of media programs has undergone substantial changes in the past decade. Previously, media programs (which may include audio, video, or both) were disseminated either by analog broadcast (conventional, satellite, or cable) or by dissemination of films to movie theaters.

These traditional dissemination and playback means remain in use after the advent of digital technology. However, digital technologies have had a profound effect on the dissemination and playback of media programs.

First, digital technology permitted the use of digital video recorders (DVRs). DVRs, while similar in function to standard analog video cassette recorders (VCRs), provide a number of additional useful functions including live pause, the ability to record one program while playing back another, and the integration of the electronic program guides with DVR functionality (so that the recordation of media programs could be scheduled far in advance).

Second, digital technology also permitted the dissemination and playback of media programs via the Internet, and with improved signal processing and more and more households with high-speed Internet access (e.g. DSL, fiber, and/or satellite). These methods of dissemination and playback have become competitive with traditional means. Dissemination of media programs via the Internet may occur either by simple downloading, progressive downloading or streaming.

For progressive download, a media file having the media program is downloaded via the Internet using dial-up, DSL, ADSL, cable, T1, or other high speed connection. Such downloading is typically performed by a web server via the Internet.

Simple downloading downloads the bytes of the media file in any convenient order, while progressive download downloads bytes at the beginning of a file and continues downloading the file sequentially and consecutively until the last byte. At any particular time during progressive downloading, portions of the file may not be immediately available for playback. In some situations, the entire file must be downloaded first before a media player can start playback. In other progressive download situations, media players are able to start playback once enough of the beginning of the file has been downloaded, however, the media player must download enough information to support some form of playback before playback can occur. Playback of progressively downloaded media files is often delayed by slow Internet connections and is also often choppy and/or contains a high likelihood of stopping after only a few seconds. Once a progressively downloaded media program has been completely downloaded, it may be stored on the end-user computer for later use.

One of the disadvantages of a progressive downloading is that the entity transmitting the data (the web server) simply pushes the data to the client as fast as possible. It may appear to be "streaming" the video because the progressive download capability of many media players allows playback as soon as an adequate amount of data has been downloaded. However, the user cannot fast-forward to the end of the file until the entire file has been delivered by the web server. Another disadvantage with progressive downloading is that the web server does not make allowances for the data rate of the video file. Hence, if the network bandwidth is lower than the data rate required by the video file, the user must wait a period of time before playback can begin. If playback speed exceeds the data transfer speed, playback may be paused for a period of time while additional data is downloaded, interrupting the viewing experience. However, the video playback quality may be higher when the playback occurs because of the potentially higher data rate. For example, if a 100 Kbps video file can be delivered over a 56 kbps modem, the video will be presented at the 100 kbps rate, but there may be periods when playback will be paused while additional video data is downloaded. The video data is typically downloaded and stored as a temporary file in its entirety.

Web servers typically use HTTP (hypertext transport protocol) on top of TCP (transfer control protocol) to transfer files over the network. TCP, which controls the transport of data packets over the network, is optimized for guaranteed delivery of data, not speed. Therefore, if a browser senses that data is missing, a resend request will be issued and the data will be resent. In networks with high delivery errors, resend requests may consume a large amount of bandwidth. Since TCP is not designed for efficient delivery of adequate data or bandwidth control (but rather guaranteed delivery of all data), it is not preferred for the delivery of video data in all applications.

Streaming delivers media content continuously to a media player and media playback occurs simultaneously. The end-user is capable of playing the media immediately upon delivery by the content provider. Traditional streaming techniques originate from a single provider delivering a stream of data to a set of end-users. High bandwidths and central processing unit (CPU) power are required to deliver a single stream to a large audience, and the required bandwidth of the provider increases as the number of end-users increases.

Unlike progressive downloading, streaming media can be delivered on-demand or live. Wherein progressive download requires downloading the entire file or downloading enough of the entire file to start playback at the beginning, streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities.

A streaming media server is a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player. Unlike the web server, the streaming media server communicates with the user computer using control messages and data messages to adjust to changing network conditions as the video is played. These control messages can include commands for trick play functions such as fast forward, fast reverse, pausing, or seeking to a particular part of the file. Since a streaming media server transmits video data only as needed and at the rate that is needed, precise control over the number of streams served can be maintained. Unlike the case with progressive downloading, the viewer will not be able to view high data rate videos over a lower data rate transmission medium. However, streaming media servers (1) provide users random access to the video file, (2) allows monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming media servers may use HTTP and TCP to deliver video streams, but generally use RSTP (real time streaming protocol) and UDP (user datagram protocol). These protocols permit control messages and save bandwidth by reducing overhead. Unlike TCP, when data is dropped during transmission, UDP does not transmit resent requests. Instead, the server continues to send data. Streaming media servers can also deliver live webcasts and can multicast, which allows more than one client to tune into a single stream, thus saving bandwidth.

The foregoing technologies permit a broad spectrum of media programs to be made available to the user for immediate viewing. One of the challenges in providing such a broad array of media programs is that it is difficult for the user to find programs of interest from among the many programs available. Interfaces can be provided that place media programs into different categories that can be searched by the user, however such interfaces are only useful if the user already has an idea about what kind of media program they are interested in. Offbeat, unusual, or difficult to categorize media programs, for example, would be difficult to find with such interfaces.

One solution to this problem is to use a recommendation engine to recommend one or more programs to a user. Such recommendation engines can generate recommended media programs based on a number of possible factors, including how close one particular media program is related to another media program in such a way so that it may be inferred that if the user likes one program, it is more likely than average that they will like a second program.

One method for determining if two media programs are related as described above is to employ user feedback regarding media programs that they have been exposed to. Such user feedback may be direct, indirect, expressed, or inferred. For example, feedback may include watching the media program itself (a user that watches an entire media program is more likely than not to like the media program), expressly rating the media program (e.g. the user is expressly asked whether they enjoy the media program, and the response is recorded and used to recommend other media programs to the user or the same media program to other users), subscribing to a series of media programs (which provides an even stronger implication that the user likes the media programs in question), or queuing a media program. The notion is that the more users give similar feedback to two particular media program, the closer those two media programs are related, and the more appropriate it may be for to recommend one of those media programs to a user who has viewed or is viewing the other media program.

As described herein, different approaches have been devised to use user feedback to perform the task of recommending media programs, and such approaches work well in most circumstances. However, the weakness in all known approaches is that the popularity of the media programs involved can skew the results. For example, consider a case with a first media program (i) and a second media program (j). If media program (j) were very popular, media program (i) would be assumed to be related to media program (j) even if media program (i) and media program (j) had no apparent similarities. This occurs because so many users have positive feedback for media program (j) that at least part of those users will also like media program (i), regardless of how closely related the two media programs are. Thus, two completely unrelated media programs may be determined to be related to one another, and one of those media programs improvidently recommended to a user.

What is needed is a more accurate approach for measuring the relatedness of media programs that can be effectively used to recommend a second media program to a user who enjoys a first media program. The present invention satisfies this need.

SUMMARY OF THE INVENTION

To address the requirements described above, the present invention discloses a method and apparatus for recommending a media program of a set of media programs to a user of a set of users. The method may be practiced by performing steps comprising the steps of accepting opinion data from the set of users, the opinion data comprises a logical indication $I_u(i)$ of whether each individual user u of the set of users likes first media program (i) and a logical indication $I_u(j)$ of weather each individual user u likes the second media program (j), generating a measure $w_{ij}$ of the implied similarity of a first media program (i) and a second media program (j), and recommending a media program to at least one of the set of users according to the measure $w_{ij}$. In one embodiment, the measure $w_{ij}$ is computed by performing steps comprising the steps of computing a first factor, the first factor being a first number of users having an indication $I_u(i, j)$ of liking the first media program and the second media program, computing a second factor, the second factor being a normalized product of a second number of users having an indication $I_u(i)$ liking the first media program and a third number of users having an indication $I_u(j)$ liking the second media program, correcting the first factor by a correction factor estimating a fourth number of times that the first media program (i) and the second media program (j) are both liked by an individual user u, yet unrelated, and computing the measure $w_{ij}$ from the corrected first factor and the second factor, and recommending a media program to at least one of the set of users according to the measure $w_{ij}$. The apparatus may comprise a recommendation engine that includes a first module for accepting opinion data from the set of users, the opinion data comprises a logical indication $I_u(i)$ of whether each individual user u of the set of users likes first media program (i) and a logical indication $I_u(j)$ of weather each individual user u likes the second media program (j), a second module, for generating a measure $w_{ij}$ of the implied similarity of a first media program (i) and a second media program (j), and a third module, for recommending a media program to at least one of the set of users according to the measure $w_{ij}$. In one embodiment, the module for generating the measure $w_{ij}$ comprises means for computing a first factor, the first factor being a first number of users having an indication $I_u(i, j)$ of liking the first media program and the second media program, means for computing a second factor, the second factor being a normalized product of a second number of users having an indication $I_u(i)$ liking the first media program and a third number of users having an indication $I_u(j)$ liking the second media program, means for correcting the first factor by a correction factor estimating a fourth number of times that the first media program (i) and the second media program (j) are both liked by an individual user u, yet unrelated, and means for computing the measure $w_{ij}$ from the corrected first factor and the second factor.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
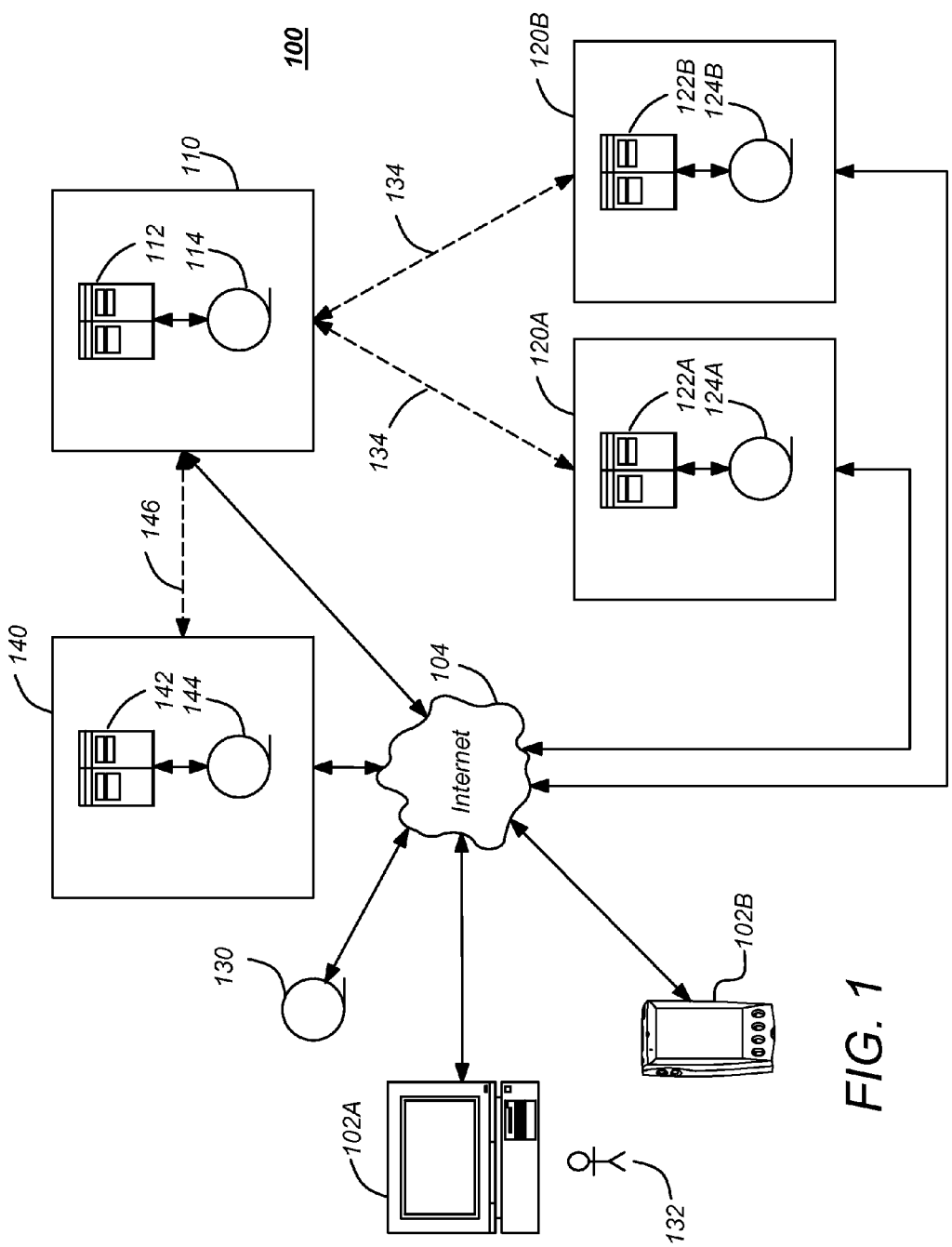
FIG. 1 is a diagram illustrating an exemplary media program system.

FIG. 1 is a diagram illustrating an exemplary media program system 100. In the illustrated embodiment, the system 100 may comprise one or more media program sources 120A, 120B, communicatively coupled to a communication network 104 such as the Internet and each having one or more source video servers 122A, 122B communicatively coupled to one or more source media program databases 124A, 124B. The media program system 100 further comprises a media program provider 110, communicatively coupled to the communication network 104, and having one or more provider video servers 112 and one or more provider databases 114. In one embodiment, the media program provider 110 is a video-on-demand and/or streaming media program provider.

The media program system 100 transmits media programs to a first user device 102A such as a computer or a second user device 102B such as a cellphone (hereinafter alternatively referred to as user device(s) 120). This transmission may be direct from the media program provider 110, or the media program provider 110 may operate as a portal, providing an interface to the media programs available from the media program sources 120A and 120B, but not the media program itself (which is instead provided by the media program source(s) 120).

In the first case, the media program provider 110 licenses media programs from the media program sources 120 (such as www.fox.com or www.nbc.com), and metadata for such programs is also typically provided to the media program provider 110 from the media program source 120 as well. Such metadata can be retrieved by the media program provider's database 114 for use. If supplementary metadata is required, it can be obtained from a metadata source 130 independent from the media program provider 110 and the media program source 120, as described further below.

In the second case, the media programs are streamed to the user device 102 directly from the servers of the media program source 120. When the media program is streamed directly from the media program source 120, it is often the case that the metadata provided by the media program source 120 is insufficient. In such cases, supplementary metadata may be obtained from independent metadata source 130 (such as www.tv.com or www.imdb.com) or other third party sources. In this circumstance, the role of the media program provider 110 is that of a portal that provides the user 132 a list of available media programs and an interface to search to find such programs and to view them.

Media programs and metadata may be obtained via a communication network 104 such as the Internet, or through auxiliary (and/or dedicated) communication links 134). Such information may be obtained by webcrawling (for example, using a program or automated script that browses the World Wide Web in a methodical, automated manner).

Using the user devices 102, remote users 132 can communicate with the media program provider 110 using the communication network 104, to obtain media programs (including video-on-demand and/or streaming video services) and to search the provider media program database 114 to find media programs of interest.

The media program system 100 may also comprise one or more advertisement providers 140, which supply advertisements that are replayed in connection with the media programs provided by the media program provider 110 or media program sources 120. In the illustrated embodiment, the advertisement provider 140 includes an advertisement provider server 142 communicatively coupled to an associated and communicatively coupled advertisement provider database 144.

Advertisements may be supplied from the advertisement provider 140 to the media program provider 110 via the Internet 104, a dedicated link 146, or by physical exchange of a memory storage device having the advertisement. Such advertisements can be provided to and stored by the media program provider 110 and streamed or downloaded along with the media program to the user device(s) 102 at the appropriate time.

In one embodiment, the advertisements are integrated with the streamed or downloaded video from the media program provider 110. In another embodiment, the advertisements are not integrated with the media program, but are instead transmitted to the user devices 102 separately from the media program, and replayed at the appropriate time using indices that indicate when each advertisement should be presented. For example, advertisements can be indexed and streamed or downloaded to the user devices 102 (from the media program provider 110 or the advertisement provider 140), and such advertisements can be played back to the user 132 at times indicated by corresponding indices in the media program.

Figure 2:
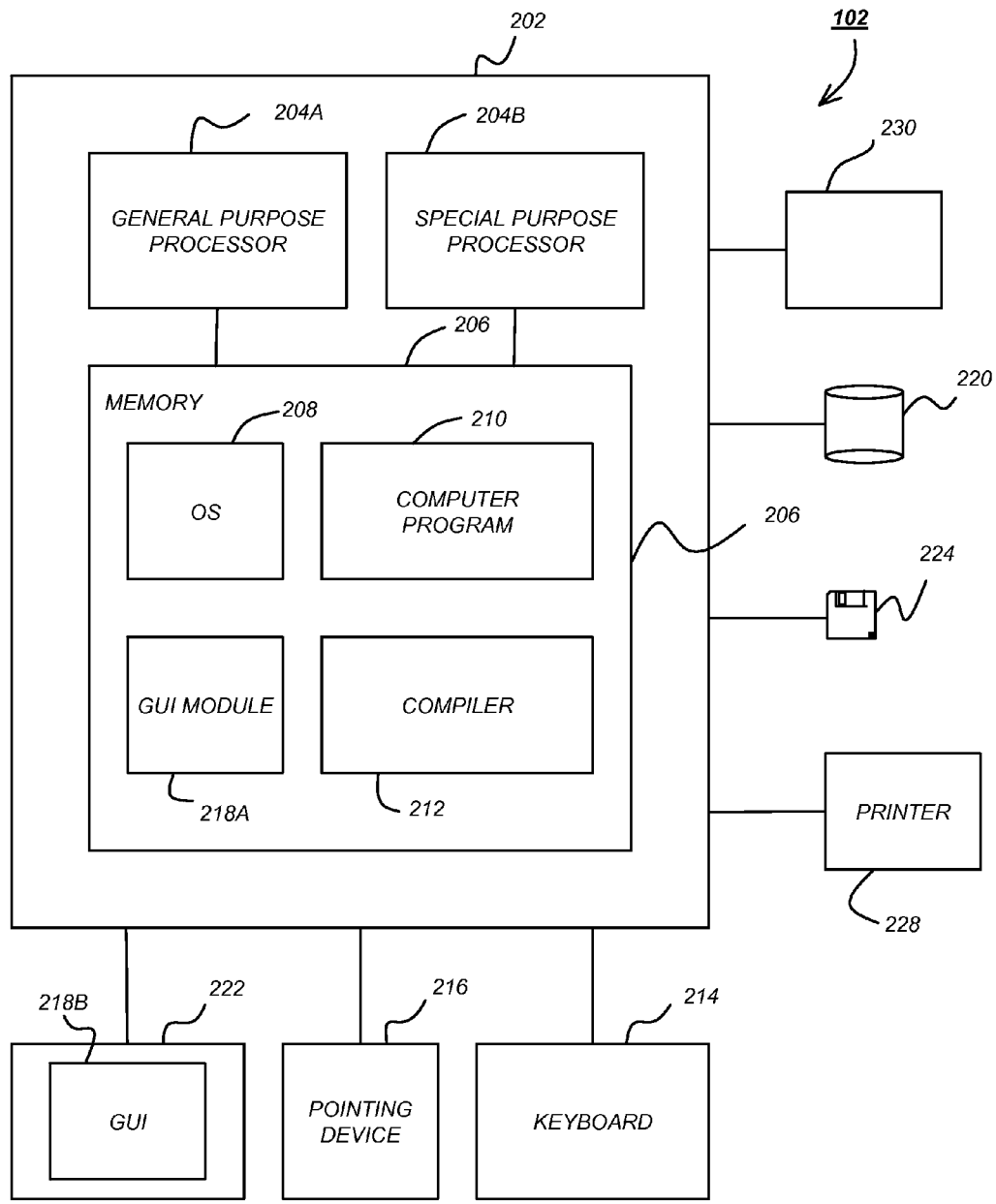
FIG. 2 is a diagram illustrating an exemplary processing system that could be used to implement elements of the present invention.

FIG. 2 illustrates an exemplary processing system 202 that could be used to implement elements of the present invention, including the user devices 102, servers 112, 122, and 142 and the databases 114, 124, and 144. The computer 202 comprises a general-purpose hardware processor 204A and/or a special purpose hardware processor 204B (hereinafter alternatively collectively referred to as processor 204) and a memory 206, such as random access memory (RAM). The computer 202 may be coupled to other devices, including input/output (I/O) devices such as a keyboard 214, a mouse device 216 and a printer 228.

In one embodiment, the computer 202 operates by the general-purpose processor 204A performing instructions defined by the computer program 210 under control of an operating system 208. The computer program 210 and/or the operating system 208 may be stored in the memory 206 and may interface with the user 132 and/or other devices to accept input and commands and, based on such input and commands and the instructions defined by the computer program 210 and operating system 208 to provide output and results.

Output/results may be presented on display 222 or provided to another device for presentation or further processing or action. Typically, the display 222 comprises a plurality of picture elements (pixels) that change state to collectively present an image to the user 132. For example, the display 222 may comprise a liquid crystal display (LCD) having a plurality of separately addressable pixels, each with a liquid crystal that changes to an opaque or translucent state to form a part of the image on the display in response to the data or information generated by the processor 204 from the application of the instructions of the computer program 210 and/or operating system 208 to the input and commands. Similarly, plasma displays include a pixel having three separate subpixel cells, each with a different color phosphor. The colors blend together to create the color presented in the pixel. Pulses of current flowing through the cells are varied according to the data generated by the processor from the application of the instructions of the computer program and/or operating system 208 in response to input and commands, changing the intensity of the light provided by the pixel. Also, similarly, cathode ray tube (CRT) displays include a plurality of pixels, each with each pixel having subpixels typically represented by dots or lines from an aperture grille. Each dot or line includes a phosphor coating that glows when struck by electrons from an electron gun. In response to the data generated by the processor from the application of instructions of the computer program and/or operating system 208 and in response to input and commands, the electrons emitted by the electron gun are steered at the dots or lines, thus changing the state of the associated pixel by causing the phosphor coating of that dot or line to glow.

The image may be provided through a graphical user interface (GUI) module 218A. Although the GUI module 218A is depicted as a separate module, the instructions performing the GUI functions can be resident or distributed in the operating system 208, the computer program 210, or implemented with special purpose memory and processors.

Some or all of the operations performed by the computer 202 according to the computer program 110 instructions may be implemented in a special purpose processor 204B. In this embodiment, some or all of the computer program 210 instructions may be implemented via firmware instructions stored in a read only memory (ROM), a programmable read only memory (PROM) or flash memory within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 202 may also implement a compiler 212 which allows an application program 210 written in a programming language such as COBOL, C++, FORTRAN, or other language to be translated into processor 204 readable code. After completion, the application or computer program 210 accesses and manipulates data accepted from I/O devices and stored in the memory 206 of the computer 202 using the relationships and logic that was generated using the compiler 212.

The computer 202 also optionally comprises an external communication device such as a modem, satellite link, Ethernet card, or other device for accepting input from and providing output to other computers.

In one embodiment, instructions implementing the operating system 208, the computer program 210, and the compiler 212 are tangibly embodied in a computer-readable medium, e.g., data storage device 220, which could include one or more fixed or removable data storage devices, such as a zip drive, floppy disc drive 224, hard drive, CD-ROM drive, tape drive, DVD, etc. Further, the operating system 208 and the computer program 210 are comprised of computer program instructions which, when accessed, read and executed by the computer 202, causes the computer 202 to perform the steps necessary to implement and/or use the present invention or to load the program of instructions into a memory, thus creating a special purpose data structure causing the computer to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 202.

Although the term "user computer" or user device is referred to herein, it is understood that a user computer or computer may include portable devices such as cellphones, portable MP3 players, video game consoles, notebook computers, pocket computers, personal data assistants (PDAs) or any other device with suitable processing, communication, and input/output capability.

Figure 3:
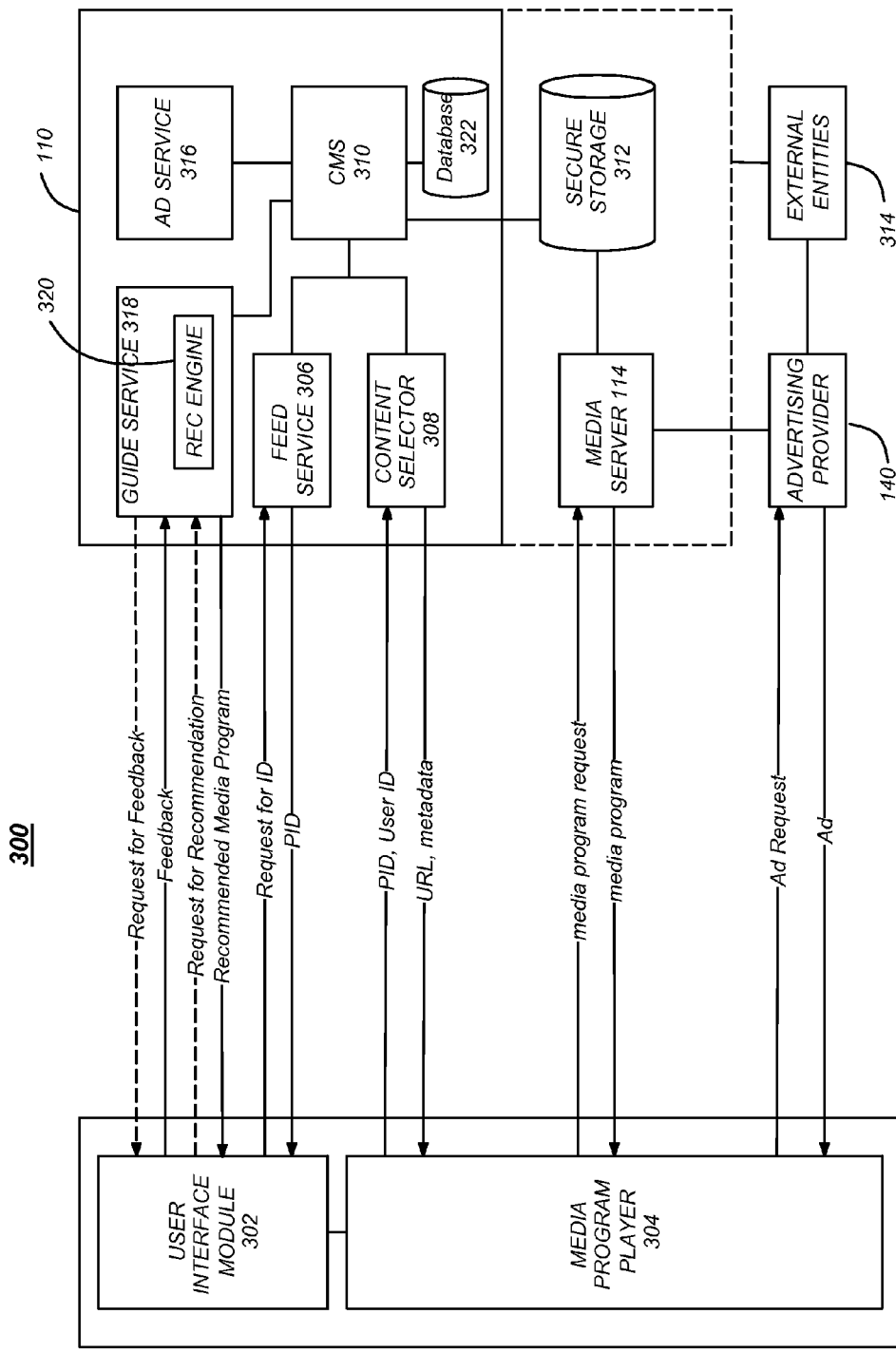
FIG. 3 is a diagram illustrating a first embodiment of a content delivery subsystem.

FIG. 3 is a diagram illustrating a first embodiment of a content delivery subsystem (CDS) 300 and top-level operations that can be used to offer and deliver media programs for selection and presentation to the user 132. In the illustrated embodiment, the content delivery subsystem 300 includes the user device 102, a media program provider 110, and an advertisement provider 140.

In the illustrated embodiment, the media program provider 110 comprises a content management service 310, an advertisement service 316, a feed service 306, a content selector 308, and a guide service 318 which includes a recommendation engine 320. The CMS 310 stores data in database 322, including metadata regarding available media programs and user data.

In one embodiment, the recommendation engine 320 of the guide service 318 transmits a feedback request to the user device 102. This request may be transmitted after playback of the media program for which feedback is requested, or at another time. A request for feedback regarding a media program may also occur in response to provision of a guide service. For example, if a media program guide is provided to the user device 102, the media programs presented therein may include an interface that allows the user 132 to indicate whether they have viewed that media program, and if so, whether they liked the media program or how much they liked the media program.

The user then provides feedback regarding the media program(s) and transmits the feedback or opinion data to the recommendation engine 320. The recommendation engine receives the opinion data and stores it in the database 322 via the CMS 322 for later use as described below.

The same user 132 or another user 132 may then transmit a request for a recommendation to the recommendation engine 320. Using data retrieved from the database 322, the recommendation engine 320 generates one or more recommended media programs, and transmits information from which the user device 102 may gain access to those recommended media programs to the user device 102 for presentation by the user interface module 302. Further details regarding these operations are presented below.

When the user 132 selects a media program using the user device 102, a message is transmitted from the user device 102 to the media program provider 110 requesting the media program identifier (PID) of the selected media program.

The feed service 306 receives the request, and using information obtained from secure storage 312 or database 322 via the content management service 310, the feed service 306 determines the PID for the selected media program and transmits the PID to the user device 102. The user device transmits this PID and a user ID to the content selector 308 of the media program provider 110. The content selector 308 forwards the information to the content management service 310, which uses the advertisement service 318 to select advertisements appropriate for the user and selected media program, using information stored in secure storage 312. This may be accomplished as described in co-pending patent application Ser. No. 12/787,679, entitled "METHOD AND APPARATUS FOR RAPID AND SCALEABLE DIRECTED ADVERTISING SERVICE," by Wing Chit Mak, filed May 26, 2010, which application is hereby incorporated by reference herein. The content management service 310 forwards this information to the content selector 318, which transmits information from which the user device 102 may obtain the selected media program from the media server 114, as well as advertisements from the advertising provider 140. In the illustrated embodiment, this information includes the address (e.g. URL) where the desired media program can be obtained from the media server 114. The user device 102 transmits a media program request to the media server 114 at a specified address. The media server 114 retrieves the media program from secure storage, and transmits the media program to the user device 102. The user device 102 may also request advertisements from the advertising provider 120 and receive them as well.

Although the advertisement provider 140 and media server 114 is illustrated as a separate architectural entity than the media program provider 110, the advertisement provider 140 may be integrated with the media program provider 110 (that is, the media program provider may also provide the advertisements). The CDS 300 provides a means to provide media programs and advertisements across a plurality of distribution networks, which may include www.hulu.com, www.imdb.com, www.aol.com or www.msn.com.

Metadata related to media program and advertisement content as well as streaming information is stored in the content delivery system 300 in databases 312 and 322, as is data describing where the media programs and advertisements may be found within the CDS 300.

The user device 102 may include an interface module 302 and a media program player 304. The interface module 302 includes instructions performed by the user device 102 that are used to present information and media programs to the user 132 and to accept user input, including commands. Exemplary user devices 102 are a desktop computer, a laptop computer, or a portable device such as an IPOD, IPHONE, IPAD, a portable telephone, or a PALM device.

Figure 4:
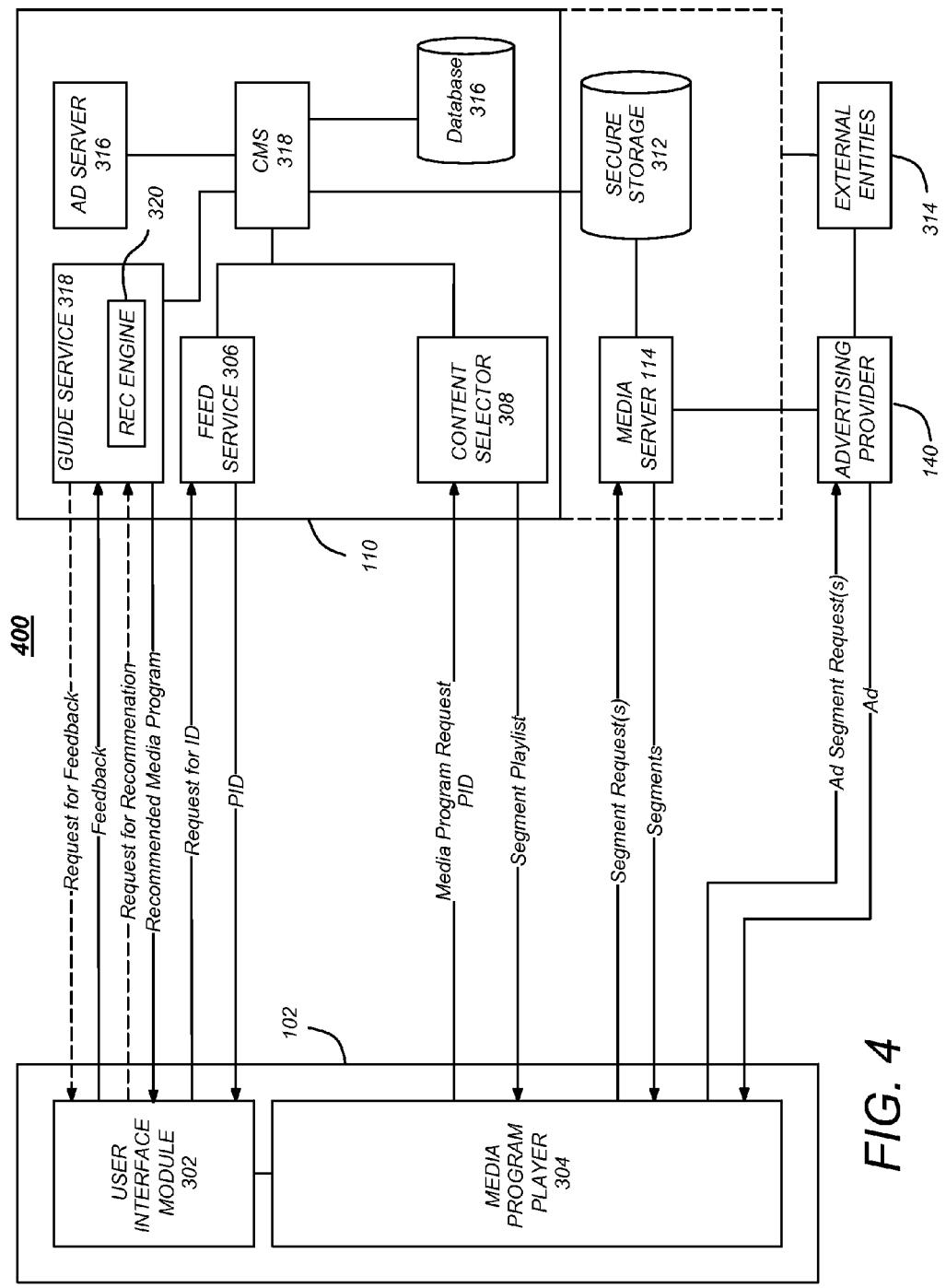
FIG. 4 is a diagram illustrating the transmission of media programs according to a live streaming protocol.

FIG. 4 is a diagram illustrating the transmission of media programs according to a live streaming protocol. Fundamentally, this protocol is similar to the protocol illustrated in FIG. 3, except that the when the user device 102 requests the media program, it is provided with a "playlist" of small segments or "chunks" of the media program. The user device 102 uses the playlist to request transmission of each chunk of the media program in order, and when each chunk is received, it is processed and assembled into the media program presented to the user 132.

As shown in FIG. 4, the user device 102 transmits a request for the PID of the media program to the feed service 306. The request typically comprises a user ID or a proxy thereof, as well as some identification for the media program. The feed service 306 receives the request, and obtains the PID of the requested media program from the CMS 310, using information obtained from secure storage 312 and content metadata/streaming information database. The PID is then transmitted to the user device 102. The user device then transmits a media program request with the PID to the content selector 308.

In this embodiment, the media program is broken up into a plurality of segments or chunks that can be transmitted to the user device 102 upon request from the user device 102. Which segments to request and the order to request them is determined by a segment playlist that is transmitted from the media program provider 110 to the user device 102.

The live streaming protocol includes the transmission of a segment playlist having addresses or URIs to the media program segments to the media program player 304. Since the media program player 304 has the information necessary to retrieve any segment (and hence, any frame) using the addresses or URIs in the segment playlist, the user interface module 302 implementing the interface 400, responds to the media program navigation commands by determining segment having the media program frames complying with the navigation request, requesting such segments (if they have not already been received and buffered), and presenting the frames from such segments as indicated above.

Regardless of the technique used to transmit media program information to the media program player 304 one of the challenges in offering a wide variety of media programs to users 132 is in presenting such users 132 with information that allow the user 132 to find and select media programs of interest. One approach is to provide the user with a program guide in which media programs are suitably categorized (e.g. by type, content, actors or any number of factors). This may allow the user to find media programs of interest, but are of little use in directing the user to media program of which they know nothing about, but are still likely to enjoy.

One of the techniques that can be used to use the user interface module 302 provide the user with such input is to provide recommended media programs to the user. Such recommendations can be provided in response to a user 132 request for such recommendations, or without a user request. For example, the user interface module 302 may recommend media programs of interest to the user 132 when the user first accesses the content delivery system 300, when the user 132 is browsing or querying the database 316 to find media programs of interest, when the media program player 304 is playing a media program, or when the media program player 304 has or is about to complete playback of a media program.

Figure 5:
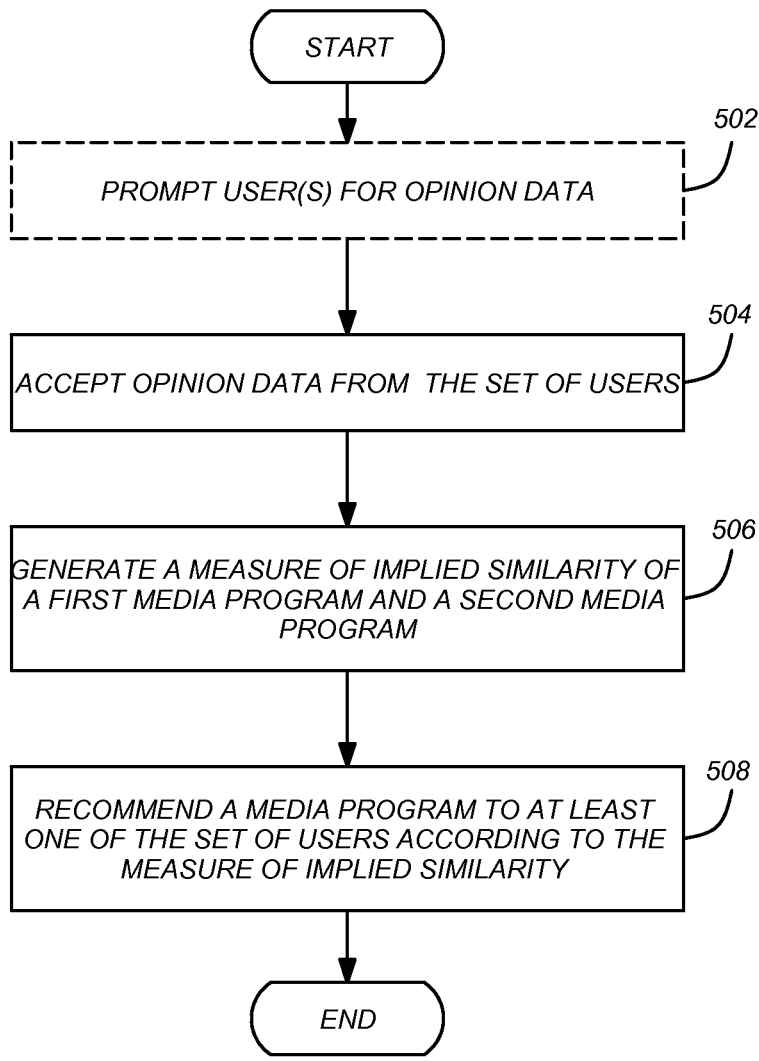
FIG. 5 is a diagram presenting exemplary method steps that can be used to provide media program recommendations.

FIG. 5 is a diagram presenting exemplary method steps that can be used to provide media program recommendations to users 132. In block 504, opinion data is accepted from one or more of the users 132 in a set of users. The opinion data may include, for example, any combination of data indicating that the user 132 has watched more than a threshold percentage of the media program, that the user 132 has expressly rated the media program, that the user 132 has subscribed to the media program or a series of the media program, or that the user 132 has queued the media program for recording or later playback. In one embodiment, the opinion (or feedback) data may be logical data (chosen from a list of logical alternatives) or Boolean data (one of two values such as "yes" or "no" or a "1" or "0").

As shown in block 502, the user 132 may be prompted to provide such information, and this prompt may be provided after the user has viewed the media program (e.g. at the end of media program playback or in response to an indication that the user has already seen the media program and does not wish to see it again), during viewing of the media program, or before viewing of the media program. In some cases, the opinion data is inherent to the viewing of the program (e.g. the user is presumed to like the media program if they have watched it for a minimum time period) or other activity (e.g. queuing or subscribing to a media program).

One way to determine the similarity of two media programs for purposes of using this similarity to recommend similar programs to a user is to perform the computation shown in Equation 1:

$$w_{ij} = \frac{\sum_u w(u) I_u(i,j)}{\sqrt{\sum_u w(u) I_u(i) * \sum_u w(u) I_u(j)}}$$
Equation (1)

wherein:
$w_{ij}$ is a measure of how close media program (i) is related to media program (j);
$I_u(i, j)$ is an indication whether user u likes or dislikes media programs (i) and (j) such that $I_u(i, j)=1$ if user u likes both media program (i) and media program (j), and $I_u(i, j)=0$ otherwise;
$I_u(i)$ is an indication whether user u likes media program (i), such that $I_u(i)=1$ if user u likes media program (i) and $I_u(i)=0$ if user u does not like media program (i);
$I_u(j)$ is an indication whether user u likes media program (j) such that $I_u(j)=1$ if user u likes media program (j) and $I_u(i)=0$ if user u does not like media program (j); and
$w(u)$ is a weighting factor weighting the contribution of user u.

Another way to determine the similarity of two media programs is to use the cosine based similarity relation described in Equation 2:

$$w_{ij} = \frac{\sum_{u \in U(i,j)} w(u)(r_u(i) - \bar{r}_u)(r_u(j) - \bar{r}_u)}{\sqrt{\sum_{u \in U(i,j)} w(u)(r_u(i) - \bar{r}_u)^2 * \sum_{u \in U(i,j)} w(u)(r_u(j) - \bar{r}_u)^2}}$$
Equation 2 wherein:
$r_u(i)$ is the rating for media program (i) by user u;
$\bar{r}_u$ is the average rating by user u; and $U(i, j)$ is the set of users that have opinions for media programs (i) and (j).

The difficulty with such techniques is that they all compute the similarity based on the number of cases in which the two media programs share similar feedback. While the foregoing techniques work well in most circumstances, they do not work well when one or more of the media programs are significantly more popular than the others. For example, if media program (j) is very popular, the relationship shown in Equation 1 would indicate that media program (i) is related to media program (j) even if there they are not, in fact, similar. This arises because so many users will have feedback for media program (j) that some of them will provide a similar opinion of media program (i), even if they are truly unrelated and indicated as enjoyed by the same user as being enjoyed.

This problem can be ameliorated by estimating the number of instances in which the two media programs are unrelated and yet share similar feedback opinions from users. This estimated number can be removed before calculating the relatedness of the media programs $w_{ij}$. For example, the relationship described in Equation (1) can be modified as shown in Equation 3 below:

$$w_{ij} = \frac{\sum_u w(u) I_u(i,j) - \sum_u [w(u) I_u(i) P(j)(N_u(j) - I_u(i>j))]}{\sqrt{\sum_u w(u) I_u(i) * \sum_u w(u) I_u(j)}}$$
Equation (3)

wherein:
$I_u(i>j)=1$ if the user enjoys media program (i) after the release of media program (j) and $I_u(i>j)=0$ otherwise (note that if $I_u(i>j)=1$, the number of chances that the program (j) could be liked by user u is decreased by 1, since the user has used up a "chance" by liking program (i), they cannot use the same chance to like program (j); and The popularity of a media program $$(j) = P(j) = \frac{\sum_u I_u(j)}{\sum_u N_u(j)},$$

where $N_u(j)$ is the number of chances that the program (j) could be liked by the user u.

Using a relationship such as is described in Equation (3), a measure of the implied similarity of the first media program (i) and the second media program (j) is generated, as shown in block 506. Finally, a media program is recommended to one of the set of users using the measure of implied similarity, as shown in block 508.

Figure 6:
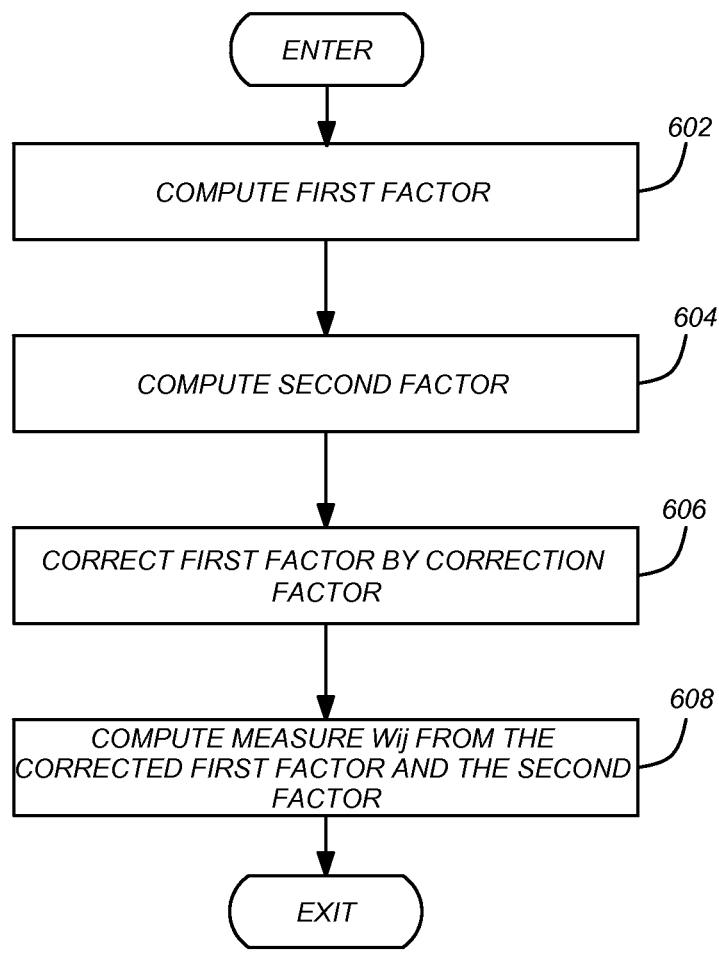
FIG. 6 is a diagram illustrating one embodiment of how a measure of implied similarity $w_{ij}$ between the first media program (i) and the second media program (j) can be generated.

FIG. 6 is a diagram illustrating one embodiment of how a measure of implied similarity $w_{ij}$ between the first media program (i) and the second media program (j) can be generated. In this embodiment, the accepted opinion data comprises a logical indication $I_u(i)$ of whether each individual user u of the set of users likes first media program (i) and a logical indication $I_u(j)$ of weather each individual user u likes the second media program (j). First, a first factor is computed, the first factor being a first number of users having an indication $I_u(i, j)$ of liking the first media program and the second media program, as shown in block 602. This first factor can be, for example, a first sum computed across the set of users, the first sum being a sum of the indication $I_u(i, j)$ that each individual user u of the set of users likes both the first media program (i) and the second media program (j). This may be represented, for example as $$\sum_u w(u) I_u(i, j)$$

where the weighting factor w(u) is optional.

Next, as shown in block 604, a second factor is computed. The second factor can include a normalized product of a second number of users having an indication $I_u(i)$ liking the first media program and a third number of users having an indication $I_u(j)$ liking the second media program. In one embodiment, second factor can be computed by computing a second sum across the set of users, the second sum being a sum of the indication that each individual user u of the set of users likes the first media program (i) (which can be represented as $$\sum_u w(u) I_u(i)),$$

computing a third number such as a third sum across the set of users, the third sum being a sum of the indication that each user of the set of users likes the second media program (j) (which can be represented as $$\sum_u w(u) I_u(i)),$$

and computing the second factor as a root of the product of the second sum and the third sum.

Next, as shown in block 606, the first factor is corrected by a correction factor. In one embodiment, this is accomplished by computing a correction factor C(i,j) that estimates a number of times that the first media program (i) and the second media program (j) will both be liked by an individual user u, yet unrelated and subtracting the correction factor C(i,j) from the first factor.

Next, as shown in block 608, the measure $w_{ij}$ is computed from the corrected first factor and the second factor. In one embodiment, this is accomplished by computing the measure as a ratio of the first factor to the second factor.

In one embodiment, the correction factor C(i,j) is computed by (1) generating a popularity P(j) of the second media program (j), (2) computing a difference between the number $N_u(j)$ of media programs indicated as liked by each individual user u of the set of users after a release of the second media program (j) and an indication $I_u(i>j)$ that each individual user u of the set of users likes the first media program (j) after release of the second media program (j), (3) generating, for each individual user u of the set of users, a product of the indication $I_u(i)$ that each user of the set of users likes the first media program (i) the difference between $N_u(j)$ and $I_u(i>j)$ and the popularity P(j), and (4) summing the product of the indication $I_u(i)$ that each user of the set of users likes the first media program (i) the difference between $N_u(j)$ and $I_u(i>j)$ and the popularity P(j) over all individual users u in the set of users. The result may be expressed, for example as $$\sum_u [w(u) I_u(i) P(j)(N_u(j) - I(i > j))].$$

The popularity P(j) of the second media program (j) may be computed from a fourth sum, across the set of users, of the number of times each user liked the second media program (j) and a fifth sum, across the set of users, of the number of media programs liked by each user of the set of users after a release of media program (j). In one embodiment, the popularity P(j) of the second media program (j) is computed as a ratio of the first sum and the second sum, or:

$$P(j) = \frac{\sum_u I_u(j)}{\sum_u N_u(j)}.$$  Equation (4)

NUMERICAL EXAMPLE

Table I presents a numerical example of ten users u1-u10. In the numerical example, there are ten users, each of whom have indicated that they like three items, and only three items.

TABLE I

| User | ID of First Item Liked | ID of Second Item Liked | ID of Third Item Liked |
|---|---|---|---|
| u1 | 54 | 1318 | 1603 |
| u2 | 54 | 70 | 1318 |
| u3 | 54 | 77 | 105 |
| u4 | 17 | 1318 | 1603 |
| u5 | 54 | 568 | 1318 |
| u6 | 53 | 54 | 1318 |
| u7 | 48 | 53 | 2231 |
| u8 | 54 | 789 | 1318 |
| u9 | 3 | 49 | 2404 |
| u10 | 54 | 70 | 3003 |

Since all users have enjoyed only three items, the value w(u) which weights the contribution from each user is not a factor and can be disregarded. The values for $I_u(i)$, which indicate whether the user u has enjoyed item a particular item i can be described as shown in Table II:

TABLE II

| User | Item_54 | Item_1318 | Item_1603 |
|---|---|---|---|
| u1 | $I_{u1}(54) = 1$ | $I_{u1}(1318) = 1$ | $I_{u1}(1603) = 1$ |
| u2 | $I_{u2}(54) = 1$ | $I_{u2}(1318) = 1$ | $I_{u2}(1603) = 0$ |
| u3 | $I_{u3}(54) = 1$ | $I_{u3}(1318) = 0$ | $I_{u3}(1603) = 0$ |
| u4 | $I_{u4}(54) = 0$ | $I_{u4}(1318) = 1$ | $I_{u4}(1603) = 1$ |
| u5 | $I_{u5}(54) = 1$ | $I_{u5}(1318) = 1$ | $I_{u5}(1603) = 0$ |
| u6 | $I_{u6}(54) = 1$ | $I_{u6}(1318) = 1$ | $I_{u6}(1603) = 0$ |
| u7 | $I_{u7}(54) = 0$ | $I_{u7}(1318) = 0$ | $I_{u7}(1603) = 0$ |
| u8 | $I_{u8}(54) = 1$ | $I_{u8}(1318) = 1$ | $I_{u8}(1603) = 0$ |
| u9 | $I_{u9}(54) = 0$ | $I_{u9}(1318) = 0$ | $I_{u9}(1603) = 0$ |
| u10 | $I_{u10}(54) = 1$ | $I_{u10}(1318) = 0$ | $I_{u10}(1603) = 0$ |

To simplify the analysis, we assume all items (Item_54, Item_1318 and Item_1603) where released at the same time. In this case, $N_u(i)$, which is the number of items that user u has liked after item (i)'s release equals the total count of items that the user has enjoyed. Therefore, $N_u(i)$ is as described in Table III:

TABLE III

| User | $N_u(i)$ |
|---|---|
| u1 | 3 |
| u2 | 3 |
| u3 | 3 |
| u4 | 3 |

TABLE III-continued

| User | $N_u(i)$ |
|---|---|
| u5 | 3 |
| u6 | 3 |
| u7 | 3 |
| u8 | 3 |
| u9 | 3 |
| u10 | 3 |

Because 7 users enjoyed Item__54, 6 users enjoyed Item__1308, and 2 users enjoyed Item__1603, the popularity P(i) of Item__54, Item__1318, and Item__1603 can be determined from Equation (4) as:

TABLE IV

| Item (i) | P(i) |
|---|---|
| 54 | 7/30 = 0.2333 |
| 1318 | 6/30 = 0.2000 |
| 1603 | 2/30 = 0.0667 |

We next compute the number of users that enjoyed both items i and j from the relationship $$\sum_u w(u) I_u(i, j).$$

Referring to Table II, we see that 5 users enjoyed both Item__54 and Item__1318 (specifically users u1, u2, u5 and u8), one user enjoyed both Item__54 and Item__1603 (user u1) and 2 users enjoyed both Item__1318 and Item__1603 (users u1 and u4). The result is somewhat analogous to a conditional probability defining how probable it is that a user would enjoy item 1603 or item 54, given that the user has enjoyed item 1318. However, as can be seen in this example, it appears that although more users liking Item__1318 also like Item__54 than like Item__1603, this may not be because Item__1318 and Item__54 are more related than Item__1318 and Item__1603. Instead, it may be because Item__54 is more popular than Item__1603.

To compensate for this popularity factor, we account for the popularity of the item using by subtracting $$\sum_u [w(u) I_u(i) P(j)(N_u(j) - I(i > j))] \text{ from } \sum_u w(u) I_u(i, j).$$

The factor $w(u) I_u(i)(N_u(j) - I(i > j))$ reflects, for every user who enjoyed item (i), how many times that user enjoyed another item besides item (i) after item (j)'s release. For example, as shown in Table I, besides liking Item__1318, user u2 also liked Item__54 and Item__70. This means that given that user u2 enjoyed two extra items besides liking Item__1318, there may expected to be 2*P(54)=0.46667 probability that the user would also like Item__54, and a 2*P(1603)=0.13333 probability that the user would also like Item__1603.

In the uncompensated model described in Equation 1, $$w_{1318,54} = \frac{5}{\sqrt{6 * 7}} = 0.77$$

and $$w_{1308,1603} = \frac{2}{\sqrt{6 * 2}} = 0.58$$

Accordingly, the uncompensated model would determine that Item__54 is more related to Item__1318 than Item__1603.

However, using the compensated model described in Equation (3), $$w_{1318,54} = \frac{5 - (5 * 2 * 0.2333)}{\sqrt{6 * 7}} = 0.41$$

$$w_{1308,1603} = \frac{2 - (2 * 2 * 0.0667)}{\sqrt{6 * 2}} = 0.50$$

Accordingly, by taking the popularity of Item__54 into account, it is apparent that Item__54 is actually less related to Item__1318 than it is with Item__1603.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

The functions described herein can be performed by one or more software, firmware or hardware "modules." The software modules may each comprise one or more instructions to be performed by a general or special purpose processor, for performing the indicated function. Firmware modules may also comprise one or more instructions to be performed by a general or special purpose processor, but the instructions are typically permanent, and cannot be easily changed. This can be implemented via a memory that can store data only once. Hardware modules may include electronic or electromechanical circuitry that is designed to perform the indicated function. Hybrid modules may include different combinations of any of the above. It is noted that in many cases, the functions performed by a particular module may be performed by other modules within the same device without altering the scope of the invention.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of recommending a media program of a set of media programs to a user of a set of users, comprising:
  accepting, by a computing device, opinion data from the set of users, wherein the opinion data comprises a logical indication $I_u(i)$ of whether each individual user u of the set of users likes a first media program (i) and a logical indication $I_u(j)$ of whether each individual user u a second media program (j);
  generating, by the computing device, a measure $w_{ij}$ of an implied similarity of the first media program (i) and the second media program (j), comprising:
    computing, by the computing device, a first factor, the first factor being a first number of users having an indication $I_u(i, j)$ of liking the first media program and the second media program, wherein computing the first factor comprises:
      computing, by the computing device, a first sum, across the set of users, the first sum being a sum of the indication $I_u(i, j)$ that each individual user u of the set of users likes both the first media program (i) and the second media program (j);

computing, by the computing device, a second factor, the second factor being a normalized product of a second number of users having an indication $I_u(i)$ liking the first media program and a third number of users having an indication $I_u(j)$ liking the second media program, wherein computing the second factor comprises:
   computing, by the computing device, a second sum, across the set of users, the second sum being a sum of the indication that each individual user u of the set of users likes the first media program (i);
   computing, by the computing device, a third sum, across the set of users, the third sum being a sum of the indication that each user of the set of users likes the second media program (j); and
   computing, by the computing device, the second factor as a root of a product of the second sum and the third sum;
correcting, by the computing device, the first factor by a correction factor C(i,j) estimating a fourth number of times that the first media program (i) and the second media program (j) are both liked by an individual user u, yet unrelated, wherein correcting the first factor comprises:
   computing, by the computing device, the correction factor C(i,j), the correction factor C(i,j) estimating a number of times that the first media program (i) and the second media program (j) will both be liked by an individual user u, yet unrelated; and
   subtracting, by the computing device, the correction factor C(i,j) from the first factor;
computing, by the computing device, the measure $w_{ij}$ from the corrected first factor and the second factor, wherein computing the measure $w_{ij}$ from the corrected first factor and the second factor comprises:
   computing, by the computing device, the measure as a ratio of the first factor to the second factor; and
recommending, by the computing device, a media program to at least one of the set of users according to the measure $w_{ij}$.

2. The method of claim 1, wherein:
computing the correction factor comprises:
   generating a popularity P(j) of the second media program (j);
   computing a difference between the number $N_u(j)$ of media programs indicated as liked by each individual user u of the set of users after a release of the second media program (j) and an indication $I_u(i>j)$ that each individual user u of the set of users likes the first media program (i) after release of the second media program (j);
   generating, for each individual user u of the set of users, a product of the indication $I_u(i)$ that each user of the set of users likes the first media program (i) the difference between $N_u(j)$ and $I_u(i>j)$ and the popularity P(j); and
   summing the product of the indication $I_u(i)$ that each user of the set of users likes the first media program (i) the difference between $N_u(j)$ and $I_u(i>j)$ and the popularity P(j) over all individual users u in the set of users.

3. The method of claim 2, wherein
the popularity P(j) of the second media program (j) is computed from a fourth sum, across the set of users, of the number of times each user liked the second media program (j) and a fifth sum, across the set of users, of the number of media programs liked by each user of the set of users after a release of media program (j).

4. The method of claim 3, wherein the popularity P(j) of the second media program (j) is computed as a ratio of the first sum and the second sum.

5. The method of claim 1, wherein:
the indication that each individual user of the set of users likes both the first media program and the second media program is multiplied by a weighting factor w(u) describing an amount of opinion data accepted from each user u before computing the first sum across the set of users;
the indication that each individual user of the set of users likes the first media program (i) is multiplied by the weighting factor w(u) before computing the second sum across the set of users;
the indication that each individual user of the set of users likes the second media program (j) is multiplied by a weighting factor w(u) describing an amount of opinion data accepted from each user u; and
the generated product of the indication $I_u(i)$ that each user of the set of users likes the first media program (i) the difference between $N_u(j)$ and $I_u(i>j)$ and the popularity P(j) is multiplied by the weighting factor w(u) before summing over all individual users u in the set of users.

6. The method of claim 5, wherein the weighting factor w(u) comprises a reciprocal of a root of a factor representing an amount of opinion data from the user u.

7. The method of claim 1, wherein:
the logical indication I(j) of whether the individual user u of the set of users likes the first media program (j) is a boolean indication; and
the logical indication I(i) of whether the individual user u of the set of users likes the first media program (i) is a boolean indication.

8. An apparatus for recommending a media program of a set of media programs to a user of a set of users, comprising:
one or more computer processors; and
a non-transitory computer-readable storage medium comprising instructions, that when executed, control the one or more computer processors to be configured for:
   accepting opinion data from the set of users, wherein the opinion data comprises a logical indication $I_u(i)$ of whether each individual user u of the set of users likes a first media program (i) and a logical indication $I_u(j)$ of whether each individual user u likes a second media program (j);
   generating a measure $w_{ij}$ of an implied similarity of the first media program (i) and the second media program (j), comprising:
      computing a first factor, the first factor being a first number of users having an indication $I_u(i, j)$ of liking the first media program and the second media program, wherein computing the first factor comprises:
         computing a first sum, across the set of users, the first sum being a sum of the indication $I_u(i, j)$ that each individual user u of the set of users likes both the first media program (i) and the second media program (j);
      computing a second factor, the second factor being a normalized product of a second number of users having an indication $I_u(i)$ liking the first media program and a third number of users having an indication $I_u(j)$ liking the second media program, wherein computing the second factor comprises:
         computing a second sum, across the set of users, the second sum being a sum of the indication that each individual user u of the set of users likes the first media program (i);

computing a third sum, across the set of users, the third sum being a sum of the indication that each user of the set of users likes the second media program (j); and computing the second factor as a root of a product of the second sum and the third sum;

correcting the first factor by a correction factor C(i,j) estimating a fourth number of times that the first media program (i) and the second media program (j) are both liked by an individual user u, yet unrelated, wherein correcting the first factor comprises:

computing the correction factor C(i,j), the correction factor C(i,j) estimating a number of times that the first media program (i) and the second media program (j) will both be liked by an individual user u, yet unrelated; and subtracting the correction factor C(i,j) from the first factor;

computing the measure $w_{ij}$ from the corrected first factor and the second factor, wherein computing the measure $w_{ij}$ from the corrected first factor and the second factor comprises:

computing the measure as a ratio of the first factor to the second factor; and recommending a media program to at least one of the set of users according to the measure $w_{ij}$.

9. The apparatus of claim 8, wherein:
computing the correction factor comprises:
generating a popularity P(j) of the second media program (j);
computing a difference between the number $N_u(j)$ of media programs indicated as liked by each individual user u of the set of users after a release of the second media program (j) and an indication $I_u(i>j)$ that each individual user u of the set of users likes the first media program (i) after release of the second media program (j);
generating, for each individual user u of the set of users, a product of the indication $I_u(i)$ that each user of the set of users likes the first media program (i) the difference between $N_u(j)$ and $I_u(i>j)$ and the popularity P(j); and
summing the product of the indication $I_u(i)$ that each user of the set of users likes the first media program (i) the difference between $N_u(j)$ and $I_u(i>j)$ and the popularity P(j) over all individual users u in the set of users.

10. The apparatus of claim 9, wherein:
the popularity P(j) of the second media program (j) is computed from a fourth sum, across the set of users, of the number of times each user liked the second media program (j) and a fifth sum, across the set of users, of the number of media programs liked by each user of the set of users after a release of media program (j).

11. The apparatus of claim 10, wherein the popularity P(j) of the second media program (j) is computed as a ratio of the first sum and the second sum.

12. The apparatus of claim 8, wherein:
the indication that each individual user of the set of users likes both the first media program and the second media program is multiplied by a weighting factor w(u) describing an amount of opinion data accepted from each user u before computing the first sum across the set of users;
the indication that each individual user of the set of users likes the first media program (i) is multiplied by the weighting factor w(u) before computing the second sum across the set of users;
the indication that each individual user of the set of users likes the second media program (j) is multiplied by a weighting factor w(u) describing an amount of opinion data accepted from each user u; and
the generated product of the indication $I_u(i)$ that each user of the set of users likes the first media program (i) the difference between $N_u(j)$ and $I_u(i>j)$ and the popularity P(j) is multiplied by the weighting factor w(u) before summing over all individual users u in the set of users.

13. The apparatus of claim 12, wherein the weighting factor w(u) comprises a reciprocal of a root of a factor representing an amount of opinion data from the user u.

14. The apparatus of claim 8, wherein:
the logical indication I(j) of whether the individual user u of the set of users likes the first media program (j) is a boolean indication; and
the logical indication I(i) of whether the individual user u of the set of users likes the first media program (i) is a boolean indication.

15. A non-transitory computer-readable storage medium containing instructions for recommending a media program of a set of media programs to a user of a set of users, the instructions, when executed, control a computer system to be configured for:

accepting opinion data from the set of users, wherein the opinion data comprises a logical indication $I_u(i)$ of whether each individual user u of the set of users likes a first media program (i) and a logical indication $I_u(j)$ of whether each individual user u likes a second media program (j);

generating a measure $w_{ij}$ of an implied similarity of the first media program (i) and the second media program (j), comprising:

computing a first factor, the first factor being a first number of users having an indication $I_u(i, j)$ of liking the first media program and the second media program, wherein computing the first factor comprises:
computing a first sum, across the set of users, the first sum being a sum of the indication $I_u(i, j)$ that each individual user u of the set of users likes both the first media program (i) and the second media program (j);

computing a second factor, the second factor being a normalized product of a second number of users having an indication $I_u(i)$ liking the first media program and a third number of users having an indication $I_u(j)$ liking the second media program, wherein computing the second factor comprises:
computing a second sum, across the set of users, the second sum being a sum of the indication that each individual user u of the set of users likes the first media program (i);
computing a third sum, across the set of users, the third sum being a sum of the indication that each user of the set of users likes the second media program (j); and
computing the second factor as a root of a product of the second sum and the third sum;

correcting the first factor by a correction factor C(i,j) estimating a fourth number of times that the first media program (i) and the second media program (j) are both liked by an individual user u, yet unrelated, wherein correcting the first factor comprises:
computing the correction factor C(i,j), the correction factor C(i,j) estimating a number of times that the first media program (i) and the second media program (j) will both be liked by an individual user u, yet unrelated; and
subtracting the correction factor C(i,j) from the first factor;

computing the measure $w_{ij}$ from the corrected first factor and the second factor, wherein computing the measure $w_{ij}$ from the corrected first factor and the second factor comprises:
computing the measure as a ratio of the first factor to the second factor; and
recommending a media program to at least one of the set of users according to the measure $w_{ij}$.

16. The non-transitory computer-readable storage medium of claim 15, wherein:
computing the correction factor comprises:
generating a popularity P(j) of the second media program (j);
computing a difference between the number $N_u(j)$ of media programs indicated as liked by each individual user u of the set of users after a release of the second media program (j) and an indication $I_u(i>j)$ that each individual user u of the set of users likes the first media program (i) after release of the second media program (j);
generating, for each individual user u of the set of users, a product of the indication $I_u(i)$ that each user of the set of users likes the first media program (i) the difference between $N_u(j)$ and $I_u(i>j)$ and the popularity P(j); and
summing the product of the indication $I_u(i)$ that each user of the set of users likes the first media program (i) the difference between $N_u(j)$ and $I_u(i>j)$ and the popularity P(j) over all individual users u in the set of users.

17. The non-transitory computer-readable storage medium of claim 16, wherein
the popularity P(j) of the second media program (j) is computed from a fourth sum, across the set of users, of the number of times each user liked the second media program (j) and a fifth sum, across the set of users, of the number of media programs liked by each user of the set of users after a release of media program (j).

18. The non-transitory computer-readable storage medium of claim 17, wherein the popularity P(j) of the second media program (j) is computed as a ratio of the first sum and the second sum.

19. The non-transitory computer-readable storage medium of claim 15, wherein:
the indication that each individual user of the set of users likes both the first media program and the second media program is multiplied by a weighting factor w(u) describing an amount of opinion data accepted from each user u before computing the first sum across the set of users;
the indication that each individual user of the set of users likes the first media program (i) is multiplied by the weighting factor w(u) before computing the second sum across the set of users;
the indication that each individual user of the set of users likes the second media program (j) is multiplied by a weighting factor w(u) describing an amount of opinion data accepted from each user u; and
the generated product of the indication $I_u(i)$ that each user of the set of users likes the first media program (i) the difference between $N_u(j)$ and $I_u(i>j)$ and the popularity P(j) is multiplied by the weighting factor w(u) before summing over all individual users u in the set of users.

20. The non-transitory computer-readable storage medium of claim 19, wherein the weighting factor w(u) comprises a reciprocal of a root of a factor representing an amount of opinion data from the user u.

* * * * *